(12) United States Patent
Frey et al.

(10) Patent No.: US 10,839,658 B2
(45) Date of Patent: Nov. 17, 2020

(54) SYSTEM AND METHOD FOR DETERMINING A PERSON IS WITHIN A PREDETERMINED DISTANCE OF AN EMITTER OF IONIZING ENERGY

(71) Applicant: Mighty Oak Medical, Inc., Englewood, CO (US)

(72) Inventors: George Frey, Englewood, CO (US); Geoff Lai, Lakewood, CO (US); Caleb Voelkel, Pine, CO (US)

(73) Assignee: MIGHTY OAK MEDICAL, INC., Englewood, CO (US)

( * ) Notice: Subject to any disclaimer, the term of this patent is extended or adjusted under 35 U.S.C. 154(b) by 0 days.

(21) Appl. No.: 16/806,049

(22) Filed: Mar. 2, 2020

(65) Prior Publication Data

US 2020/0202686 A1    Jun. 25, 2020

Related U.S. Application Data

(63) Continuation of application No. 15/623,223, filed on Jun. 14, 2017, now Pat. No. 10,580,268.

(60) Provisional application No. 62/349,980, filed on Jun. 14, 2016.

(51) Int. Cl.
```
G08B 7/06      (2006.01)
G01T 1/02      (2006.01)
G08B 21/02     (2006.01)
G01T 7/00      (2006.01)
G08B 21/22     (2006.01)
```
(52) U.S. Cl.
CPC ............ *G08B 7/06* (2013.01); *G01T 1/02* (2013.01); *G01T 7/00* (2013.01); *G08B 21/02* (2013.01); *G08B 21/22* (2013.01)

(58) Field of Classification Search
CPC .......... G08B 7/06; G08B 21/02; G08B 21/22; G01T 7/00; G01T 1/02
See application file for complete search history.

(56) References Cited

U.S. PATENT DOCUMENTS 10,580,268 B2 * 3/2020 Frey ................... G08B 21/02
2007/0295904 A1 * 12/2007 Antanouski ........... G01T 7/005
250/336.1

\* cited by examiner

*Primary Examiner* — David P Porta
*Assistant Examiner* — Meenakshi S Sahu
(74) *Attorney, Agent, or Firm* — FisherBroyles LLP; Ian R. Walsworth

(57) ABSTRACT

A system and method of protecting individuals from ionizing energy is provided. The system can determine a location of an individual with respect to a source of ionizing energy. Before the source emits ionizing energy, the system can determine patterns of ionizing energy expected to be generated by an expected emission from the source. The system can then determine if an individual is within a danger zone in which the individual is expected to receive a dose of ionizing energy above a predetermined amount. The system may also determine if an individual is outside of an optimal zone in which the individual is expected to receive less than a predetermined dose of ionizing energy without being unnecessarily distant from a working area. The system can provide a warning when an individual is within the danger or inefficient zones. Optionally, the system can prevent the source from emitting ionizing energy when an individual is within the danger zone.

18 Claims, 8 Drawing Sheets

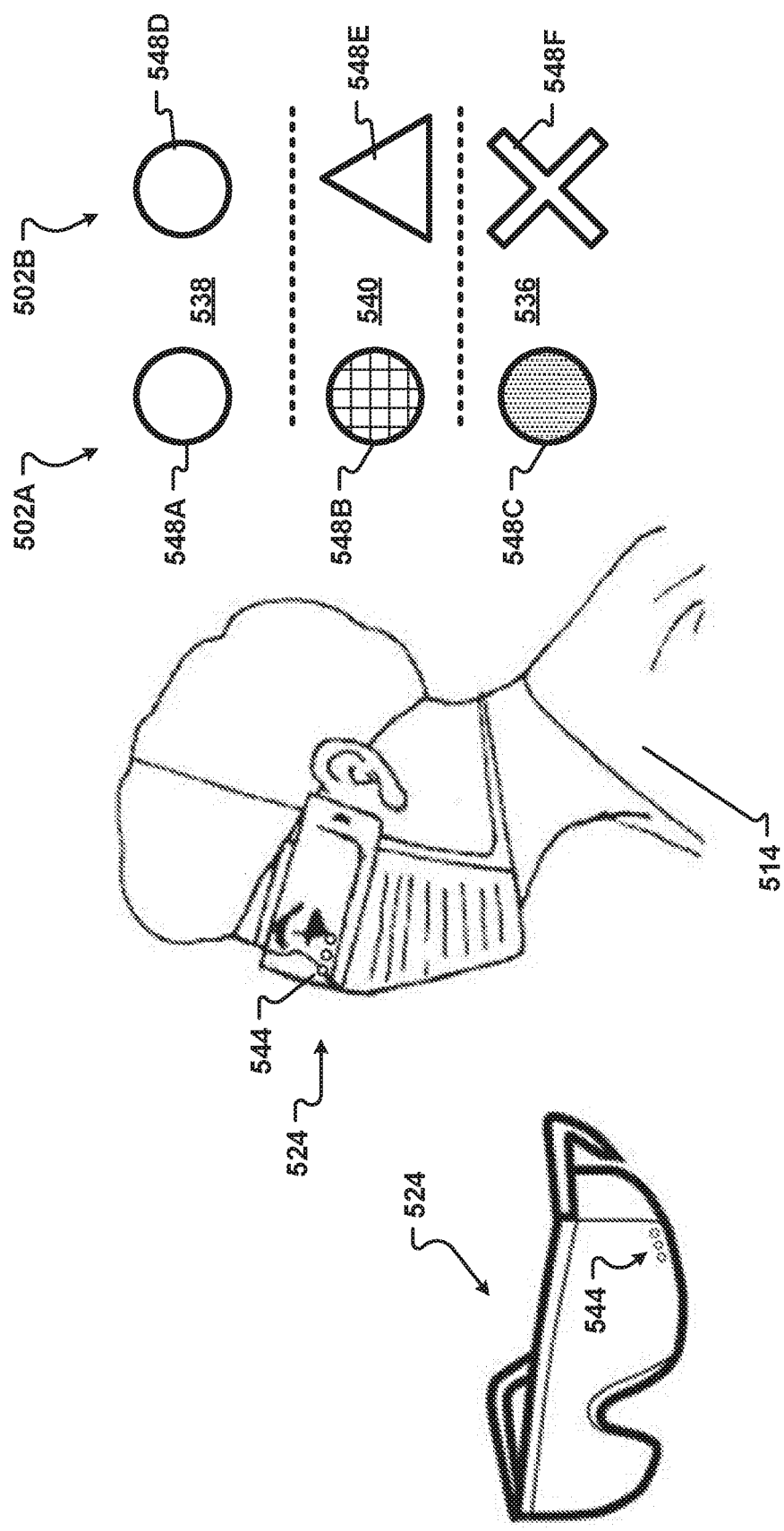

SYSTEM AND METHOD FOR DETERMINING A PERSON IS WITHIN A PREDETERMINED DISTANCE OF AN EMITTER OF IONIZING ENERGY

CROSS-REFERENCE TO RELATED APPLICATIONS

This application is a continuation of U.S. patent application Ser. No. 15/623,223, filed Jun. 14, 2017, now issued as U.S. Pat. No. 10,580,268, which in turn claims priority under 35 U.S.C. § 119(e) to U.S. Provisional Patent Application Ser. No. 62/349,980, filed Jun. 14, 2016, which is incorporated herein in its entirety by reference.

FIELD

The present disclosure relates to systems and methods to protect individuals from ionizing energy. More specifically, the present disclosure is generally directed towards devices, systems, and methods used to determine when an individual is within a predetermined distance of an emitter of ionizing energy. The system may include a device, such as a badge, worn or carried by individuals that may work within proximity to the emitter. The system may determine the presence and location of individuals with respect to the emitter by detecting the presence of the device. In one embodiment, the device may comprise a radiation dosimeter. Optionally, the system may include sensors that monitor a predetermined area around the emitter. In this manner, the system can detect the presence and location of individuals that do not have the device. The sensors may be focused in different directions from emitter. Optionally, the sensors may have different ranges associated with different levels of ionizing energy radiated by the emitter in different directions. The system may be added to an existing emitter or incorporated into new emitters.

BACKGROUND

Many individuals work in proximity to sources of radiation or ionizing energy. Although some sources emit relatively small doses of ionizing energy, during the course of a career, an individual may receive a cumulative dose of ionizing energy that is dangerous. Prolonged exposure to and/or increased doses of ionizing energy can cause cellular and chromosomal damage, potentially increasing the risk of cancer and other illnesses. As there is no clearly defined safe threshold for ionizing energy exposure, even relatively small doses could be considered dangerous and should be minimized to reduce an individual's lifetime dose of ionizing energy to the minimum amount possible.

Many government agencies, industries, and employers have established protective measures intended to reduce the radiation dose received by individuals who work in proximity to known emitters of ionizing energy. Some examples of these measures include the use of protective garments, personal dosimeters, and proscribed working distances from the emitter. Unfortunately, each of these measures includes deficiencies.

Referring now to FIG. 1A, an example of a known protective garment 104 is illustrated. Protective garments 104 offer imperfect protection from ionizing energy as much of the body of an individual wearing the protective garment 104, such as the individual's arms, neck, and head, may remain unshielded. Other protective garments are available that cover more of an individual's body. However, as will be appreciated, as the size and body coverage of the protective garment increases, the weight of the protective garment also increases. Protective glasses, gloves, and masks are also available but include many of the deficiencies of the protective garment 104.

Protective garments 104 are also generally heavy and burdensome due to the protective materials, such as lead, they incorporate. Some protective garments 104 are known to weigh at least 10-15 pounds. Certain individuals who work in proximity emitters of ionizing energy, such as surgeons and operating room staff, may be required to wear protective garments 104 for many hours. For example, some surgical procedures that are performed in conjunction with periodic use of ionizing energy may last from 6-10 hours or more. The prolonged wear of protective garments 104 can accelerate mental and physical fatigue because of the weight and discomfort of the garments. Unfortunately, this can lead to mistakes. Frequent wear of heavy protective garments 104 can also result in repetitive stress injuries to the individual.

Referring now to FIG. 1B, some protective garments 108, or drapes, are known which are suspended from a ceiling or from an emitter 112 of ionizing energy, such as a fluoroscope. These protective garments 108 may detrimentally limit the mobility of the individual. Additionally, individual's using such protective garments 104, 108 may experience decreased dexterity. Generally, as the size and body coverage of protective garments increases, the mobility and dexterity of the wearer decreases. The individual may require increased effort to move their arms and hands due to the weight of the protective garments 104, 108. This problem is exasperated when the protective garments 104, 108 extend over the arms of the individual. Further, some movements of the individual's arms may be restricted, or are not possible, when wearing one of the protective garments 104, 108. Although this may not be a problem for some individuals or in certain situations, individuals performing delicate work, such as a medical procedure, may not be able to adequately perform work while wearing one of the protective garments 104, 108. In a surgical setting, freestanding protective garments 108 can also lead to breaks in sterile technique and contamination of surgical sites.

Another less apparent problem with protective garments 104, 108 is that the protective layers within the protective garments 104, 108, such as lead, lose effectiveness over time. More specifically, the protective layers can break down due to stress caused by movement and flexion of the protective garments 104, 108. It is generally impossible for individual's wearing the protective garments to visually determine if the protective layers are defective or degraded. Because of this, some individuals may unwittingly be exposed to ionizing energy while wearing a defective or degraded protective garment 104, 108. Ensuring protective garments 104, 108 are functional requires periodic inspection, maintenance, and replacement of the protective garments 104, 108. As will be appreciated, proper inspection and maintenance of protective garments 104, 108 increases the time and expense associated with their use.

Unfortunately, many individuals that work in proximity to emitters of ionizing energy, including surgeons and operating room technicians, choose not to wear protective garments 104, 108 because of these and other problems associated with their use. As will be appreciated, protective garments 104, 108 provide no protection if they are not worn or when they are worn improperly.

Some protective measures direct or encourage individuals working in proximity to emitters of ionizing energy to wear or carry personal dosimeters. Many different types of personal dosimeters are known. However, as will be appreciated by one of skill in the art, dosimeters do not protect an individual from ionizing energy. Further, many dosimeters do not provide the individual with immediate information regarding doses received. For example, very few dosimeters provide immediate warnings to individuals when doses exceed a preset amount.

Dosimeters also do not necessarily detect the highest dose of ionizing energy received by an individual. This is because dosimeters only record the dose of ionizing energy received by the dosimeter at the location where the dosimeter is worn or carried by the individual. As many emitters produce ionizing energy that is highly focused, such as into a beam 216, doses received by different parts of an individual's body may vary greatly. More specifically, as illustrated in FIGS. 2A-2D, amounts of ionizing energy 204 measured in zones 208A-208F proximate to an emitter 112 vary based on distance and orientation of the emitter 112. Accordingly, the dose received by parts of an individual's body 214 may be higher than the dose recorded by a dosimeter. For example, in FIG. 2A the individual's hands are receiving a larger dose of ionizing energy than other parts of the individual's body. Thus, a dosimeter worn on the individual's torso may record lower doses of ionizing energy than received by other parts of the individual's body 214. Because of this, even if a dosimeter is capable of providing a warning to an individual when a dose of ionizing energy exceeds a threshold, the dosimeter may not provide a warning when expected as the dosimeter may not receive and record the highest dose of ionizing energy received by the individual.

Another deficiency of some dosimeters is that they require batteries. Other dosimeters must be activated to record doses of ionizing energy received. Individuals using dosimeters with discharged batteries, or who forget to activate their dosimeter, may receive unrecorded doses of ionizing energy. An additional problem occurs when an individual forgets to wear or carry the dosimeter.

Another way to protect individuals working around emitters of ionizing energy is by proscribing working distances from the beam of ionizing energy produced by the emitter. One article reports that at a distance of 2 meters, exposure is reduced to 0.025 percent of the intensity of the direct beam. See Chris Moore et. al., Reducing Radiation Risk in Orthopaedic Trauma Surgery, Bone & Joint Science, Vol. 2, No. 7, July 2011, available at: http://www.smith-nephew.com/global/assets/pdf/products/surgical/trigen_suresho-t_reducing_radiation_risk_wp_lores.pdf (last visited Jun. 7, 2016) which is incorporated by reference herein in its entirety. This separation distance may be a good general distance, but it is only useful if individuals are aware of the location and path of the beam of ionizing energy.

Referring again to FIGS. 2A-2D, a beam 216 of ionizing energy produced by an emitter 112 may have a variety of paths based on the orientation of the emitter 112. Further, although the beam produces the highest possible dose, another source of ionizing energy is scattered ionizing energy which is produced by interaction between the beam 216 and anything the beam strikes, including people, tables, instruments, equipment, walls, and floors. It is difficult for individuals to predict the pattern of scattered ionizing energy produced during a shot of an emitter 112 as the pattern of the scattered ionizing energy varies based on objects the beam strikes. The pattern of the scattered ionizing energy also changes as the orientation of the beam changes. Because of the variation of the shape of the pattern of scattered ionizing energy, it is difficult for individuals to decide where to stand to receive a minimal does of ionizing energy.

In one example, the scatter pattern from a C-arm fluoroscope, such as the emitter 112 illustrated in FIG. 2, is not a standard sphere with a uniform radius. Further, and referring now to FIG. 2E, zones 208 with higher amounts of ionizing energy may extend a greater distance from the target 220 on a first side of the target that is proximate to the emitter 112 compared to a second side of the target that is distal to the emitter 112. More specifically, as illustrated in FIG. 2E, an individual 214A on a first side of the target 220 proximate to the emitter 112 is mostly in the highest two zones 208A, 208B. A second individual 214B on a second side of the target 220 is standing predominately outside of zone 208A and will receive a lower dose of ionizing energy from the emitter 112. However, both individuals 214A, 214B are in similar positions of less than about 1 meter from the target 220.

Another problem is that the pattern of scattered ionizing energy can also change from one source 112 to another source. The pattern will also change based on the power setting and focus of a particular emission of ionizing energy produced by the source 112, the orientation of the source 112, and the proximity of the source 112 to a target 220, such as a patient. Accordingly, individuals may move the proscribed distance from the source 112 and/or the beam 216 yet still not be far enough away to be safe in which case the individuals will receive an accidental, and unnecessary, dose of ionizing energy. Thus, merely proscribing a distance to separate individuals from a source of ionizing energy may not adequately protect them from scattered ionizing energy.

Another deficiency with proscribing a separation distance is that some individuals may move further than necessary based on the direction of the beam or the pattern of the scattered ionizing energy. For example, referring to FIG. 2C, although the individual 214 is relatively close to both the source of ionizing energy 112 and the beam 216, the individual predominately outside of zones 208A-208F and is receiving a very small dose of ionizing energy. Thus, it may not be necessary, or beneficial, to direct the individual move further away from emitter 112.

Additionally, the separation distance can lead to inefficiencies and other problems. Referring again to FIG. 2C, if individual 214 is performing a task, moving further away from the source 112 or beam 216 when not necessary may waste time. In some situations, such as during surgical procedures, when a doctor 214 moves further away from the patient 220 than necessary, the length of the surgical procedure may increase, increasing risks for the patient. Some of the risks are those associated with excessive anesthesia or blood loss. Moving an excessive distance from the patient 220 may also increase the risk of the doctor 214 becoming contaminated. The further away a doctor or other medical processional moves away from the sterile field, the higher the likelihood of becoming contaminated. This is because with increased distance from the surgical field, the doctor 214 is more likely to touch a non-sterile surface or move outside of a clean, laminar airflow within the operating room.

Accordingly, there is a need for a system and method that can detect the presence of an individual within a predetermined proximity of an emitter of ionizing energy.

SUMMARY

Embodiments of the present disclosure provide systems, methods, and devices to determine a location of an individual with respect to a source or emitter of ionizing energy. In one embodiment, the emitter is a medical diagnostic radiography device such as, but not limited to, a computed tomography (CT) scanner or a fluoroscope.

One aspect of the present disclosure is a system and method that determines a location of an individual with respect to an emitter of ionizing energy. In one embodiment, when an individual is too close to the emitter, at least one of the individual and an operator of the emitter receive an alert. In another embodiment, when the individual is in a location that will receive less than a predetermined dose of ionizing energy from the emitter, the individual will receive a different alert.

Another aspect of the present disclosure is a system for determining a location of an individual with respect to a source of ionizing energy. In one embodiment, the system includes at least one sensor. In one embodiment, at least one sensor is positioned in proximity to the source. The sensor may optionally be integrated with the source. In this embodiment, the sensor may receive information from the source, such as a firing direction of the source, a power level of the source, and a focal point of a beam of ionizing energy produced by the source.

Optionally, a variety of different types of sensors may be used with the system. For example, one type of sensor may comprise a dosimeter that detects a dose of ionizing energy received and transmits information about the dose to the system. Another sensor may comprise a position sensor that sends information regarding the location of the sensor to the system. Yet another sensor may emit a field. The sensor can detect and measure a distance between the sensor and an object, including a person, within the field. The sensor can determine a position of an object within the field with respect to the sensor. In one embodiment, the sensor can transmit the position of the object to the system. Still another sensor may detect signals of a telecommunication device associated with an individual. Yet another sensor may detect the presence of an object worn or carried by an individual. In some embodiments, the system may include optical sensors, IR sensors, audio sensors, radio-frequency sensors, and other sensors operable to detect the presence of an individual or an electronic device carried by the individual.

At least one sensor may be positioned on or proximate to the target of the beam, such as on a patient. Another sensor may be located on a structure holding the target, such as a bed or operating table.

Additionally, at least one sensor may be attached to a portion of the source. For example, in one embodiment, a sensor is attached to a portion of a fluoroscope such as the C-arm. In another embodiment, at least one sensor may include sensors worn by individuals. The sensors worn by individuals may be associated with a device, such as a badge, worn by individuals. For example, in one embodiment, the sensor is associated with an ID badge. Optionally, the sensor may comprise an RFID that the system can detect. In one embodiment, sensors worn or carried by individuals comprise dosimeters.

In one embodiment, sensors worn or carried by individuals actively transmit location information to the system. Additionally, in another embodiment, sensors worn or carried by individuals are detectable by other sensors associated with the system. For example, in one embodiment, the sensor worn or carried by individuals may comprise a reflector that is passive. The reflector is detectable by a transceiver associated with the system. One known reflector is a Recco reflector incorporated into some clothing to help locate individuals caught in an avalanche. Additionally or alternatively, the sensors worn or carried by individuals may emit a signal that is detectable by the system and which can be used to triangulate the sensor.

Optionally, in one embodiment, the system also includes at least one receiver or antennae to receive signals from the at least one sensor. The system can determine the location of each sensor by triangulating the signals received from the sensors. In this manner, the system can determine the location of each individual with respect to the source.

The system is operable to receive information from the at least one sensor to determine a location of each sensor. The information may be transmitted between the system and the sensor by any wired or wireless communication means. For example, the system may use one or more of Bluetooth, RF/RFID, EMF, IR, and Wi-Fi to communicate wirelessly with the sensor. The system can use the information to determine an orientation of the emitter, such as a firing direction of the emitter, as well as a location of an individual carrying a sensor.

In one embodiment, the system receives information about a planned firing of the emitter from an operator of the emitter or, optionally, directly from the emitter. In another embodiment, the system provides information to the operator. For example, in one embodiment, the system provides the operator locations of all individuals with respect to the emitter.

In another embodiment, the system warns the operator and an individual when the individual is at least partially within a danger zone expected to receive greater than a predetermined dose of ionizing energy for a planned firing of the emitter. The warning may comprise one or more of a visual indication, an audible indication, or a tactile or haptic indication. For example, the system may cause a device worn by the individual to vibrate, produce a noise, or turn on a light. Optionally, the system may generate an alarm in the room in which the individual and the emitter are located. In one embodiment, the alarm may include one of more of an audible component and a visual component. In another embodiment, the system may flash lights within the room as the alarm or warning.

In another embodiment, the system may prevent firing of the emitter when an individual is at least partially within the danger zone. In still another embodiment, the system may stop the firing of the emitter when an individual, or part of the individual's body, enters the danger zone.

In one embodiment in which the system is integrated with the emitter, when the operator of the emitter activates the emitter, the system may first determine if any individual is within the danger zone. If no individual is within the danger zone the system may fire the emitter. If an individual is within the danger zone, the system may prevent firing of the emitter for a predetermined time. Optionally, the system may provide the warning before allowing the emitter to fire.

In still another embodiment, the system can be set to ignore the presence of an individual within the danger zone. For example, the system may identify the presence of an individual within the danger zone. The system may alert the operator and the individual. When the individual is adequately protected from ionizing energy, such as by wearing sufficient protective garments, it may be beneficial to fire the emitter without requiring the individual to move out of the danger zone.

In one embodiment, at least one of the operator and the individual may send a command to the system to ignore the present of the individual within the danger zone. Optionally, only the individual may send the ignore command. In this embodiment, the operator may optionally override the ignore command sent by the individual. In this manner, the operator can prevent the system from ignoring an individual in the danger zone when the individual is not wearing adequate protective gear. In another embodiment, the operator and the individual must both send the ignore command. In another embodiment, the system may not accept the ignore command when an expected dose of ionizing energy exceeds a predetermined amount. For example, the system may not accept the ignore command when the individual is at least partially within a path of a beam of ionizing energy generated by the emitter.

Optionally, the system may periodically ask for confirmation of the ignore command. For example, in one embodiment, the system will ask for confirmation of the ignore command after a predetermined period of time or after a predetermined number of shots of the emitter.

The system may include at least one output device. In one embodiment, the output device is at least one display. The display may present information about the emitter, such as, but not limited to: a representation of the beam generated by the emitter, zones of ionizing energy expected to be produced by a planned firing of the emitter, doses of ionizing energy associated with each zone and the beam, and locations of individuals in proximity to the emitter.

In one embodiment, the display presents information about the danger zone. For example, the system may present information showing the danger zone on the display. Optionally, the system may illustrate a path and a boundary of a beam of ionizing energy expected to be generated by the emitter. In another embodiment, the display presents information about a safe zone that is expected to receive less than a predetermined dose of ionizing energy from the planned firing of the emitter. Optionally, in another embodiment, the system can present information about an inefficient zone. The inefficient zone comprises an area beyond the safe zone that is further from the emitter than necessary to protect individuals from ionizing energy.

The display of the safe zone, the danger zone, and the inefficient zone may be visually distinct. For example, in one embodiment, the safe zone is a first color, the danger zone is a second color, and the inefficient zone is a third color. Optionally, the safe zone is associated with a first icon, the danger zone is associated with a second icon, and the inefficient zone is associated with a third icon.

The display may comprise a combination of fixed display devices and portable display devices. In one embodiment, a device worn or carried by an individual includes a display. The device may comprise a head's up display that presents information to the user regarding one of the safe, danger, and inefficient zone in which the individual is located.

In one embodiment, a fixed display may be positioned such that individuals in proximity to the emitter may view the display. For example, fixed displays may be positioned on one or more walls, floors, ceilings, and stands viewable by individuals proximate to the emitter. The system may present locations of all individuals as well as each of the safe, danger, and inefficient zones on each of the fixed displays.

In one embodiment, the system models each of the safe, danger, and inefficient zones. To model the zones, the system may use at least one of: a type, a manufacturer, a make, an orientation, and current settings of the emitter. The system may receive information from a database to help model the zones. In this manner, the system may consider information received from a manufacturer of the emitter regarding patterns of ionizing energy known to be produced by the emitter.

The system can also model the zones based on different types of emitters. For example, a fluoroscopic C-arm that can move in two dimensions produces different patterns of ionizing energy than a fluoroscopic C-arm that can move in three dimensions. Further, as will be appreciated by one of skill in the art, traditional, fixed CT machines produce different ionizing energy patterns than mobile, intraoperative CT machines (commonly known as cone-beam CTs), such as Medtronic's O-Arm. The system may also model the zones based on a distance of the emitter from the target, such as a patient.

Additionally, the system may receive information from sensors, such a dosimeters positioned around the emitter, to adjust the shape and size of the zones. In one embodiment, the system validates the model of the zones by recording data with dosimeters during shots of the emitter. The shots may comprise test shots conducted to calibrate or train the system and diagnostic shots conducted for a medical procedure. For example, before using the system with individuals working in proximity to the emitter, a number of test shots may be conducted with the emitter and the system. The test shots may be conducted with the emitter in a variety of orientations, at different power settings, durations, and focal points, and with a mock target a variety of distances from the emitter to calibrate the system. Optionally, the system may adjust the zones to account for safety rules proscribed by employers, facilities, and government agencies. For example, some facilities may require that individuals receive a smaller dose of ionizing energy than other facilities. Accordingly, the system may alter the size of the danger zone. Further, some individuals may be allowed to receive different doses of ionizing energy than other individuals. Thus, the contours of zones for a first individual may be different than the contours of zones for a second individual.

Although the present disclosure is described in conjunction with medical imaging devices, such as fluoroscopes, CT devices, and x-ray devices, the system and methods of the present disclosure are not limited to use with medical imaging devices. It will be appreciated by one of skill in the art that the system and methods of the present disclosure may be used with any emitter of ionizing energy. For example, the present disclosure may be used to protect workers from industrial sources of ionizing energy.

The phrases "at least one," "one or more," and "and/or," as used herein, are open-ended expressions that are both conjunctive and disjunctive in operation. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

Unless otherwise indicated, all numbers expressing quantities, dimensions, conditions, and so forth used in the specification and claims are to be understood as being modified in all instances by the term "about."

The term "a" or "an" entity, as used herein, refers to one or more of that entity. As such, the terms "a" (or "an"), "one or more" and "at least one" can be used interchangeably herein.

The use of "including," "comprising," or "having" and variations thereof herein is meant to encompass the items listed thereafter and equivalents thereof as well as additional items. Accordingly, the terms "including," "comprising," or "having" and variations thereof can be used interchangeably herein.

It shall be understood that the term "means" as used herein shall be given its broadest possible interpretation in accordance with 35 U.S.C., Section 112(f). Accordingly, a claim incorporating the term "means" shall cover all structures, materials, or acts set forth herein, and all of the equivalents thereof. Further, the structures, materials, or acts and the equivalents thereof shall include all those described in the Summary of the Invention, Brief Description of the Drawings, Detailed Description, Abstract, and Claims themselves.

The term "automatic" and variations thereof, as used herein, refer to any process or operation done without material human input when the process or operation is performed. However, a process or operation can be automatic, even though performance of the process or operation uses material or immaterial human input, if the input is received before the performance of the process or operation. Human input is deemed to be material if such input influences how the process or operation will be performed. Human input that consents to the performance of the process or operation is not deemed to be "material."

The terms "communication device," "smartphone," and "mobile device," and variations thereof, as used herein, can be used interchangeably and may include any type of device capable of communicating with one or more of another device and/or across a communications network, via a communications protocol, and the like. Exemplary communication devices may include but are not limited to smartphones, handheld computers, laptops, netbooks, notebook computers, subnotebooks, tablet computers, scanners, portable gaming devices, phones, pagers, GPS modules, portable music players, and other Internet-enabled and/or network-connected devices.

A "communication modality" can refer to any protocol or standard defined or specific communication session or interaction, such as Voice-Over-Internet-Protocol ("VoIP"), cellular communications (e.g., IS-95, 1G, 2G, 3G, 3.5G, 4G, 4G/IMT-Advanced standards, 3GPP, WIMAX™, GSM, CDMA, CDMA2000, EDGE, 1xEVDO, iDEN, GPRS, HSPDA, TDMA, UMA, UMTS, ITU-R, and 5G), Bluetooth™, text or instant messaging (e.g., AIM, Blauk, eBuddy, Gadu-Gadu, IBM Lotus Sametime, ICQ, iMessage, IMVU, Lync, MXit, Paltalk, Skype, Tencent QQ, Windows Live Messenger™ or MSN Messenger™, Wireclub, Xfire, and Yahoo! Messenger™), email, Twitter (e.g., tweeting), Digital Service Protocol (DSP), and the like.

The term "communication system" or "communication network" and variations thereof, as used herein, can refer to a collection of communication components capable of one or more of transmission, relay, interconnect, control, or otherwise manipulate information or data from at least one transmitter to at least one receiver. As such, the communication may include a range of systems supporting point-to-point or broadcasting of the information or data. A communication system may refer to the collection individual communication hardware as well as the interconnects associated with and connecting the individual communication hardware. Communication hardware may refer to dedicated communication hardware or may refer a processor coupled with a communication means (i.e., an antenna) and running software capable of using the communication means to send and/or receive a signal within the communication system. Interconnect refers some type of wired or wireless communication link that connects various components, such as communication hardware, within a communication system. A communication network may refer to a specific setup of a communication system with the collection of individual communication hardware and interconnects having some definable network topography. A communication network may include wired and/or wireless network having a pre-set to an ad hoc network structure.

The term "computer-readable medium," as used herein refers to any tangible storage and/or transmission medium that participates in providing instructions to a processor for execution. Such a medium may take many forms, including but not limited to, non-volatile media, volatile media, and transmission media. Non-volatile media includes, for example, non-volatile random access memory (NVRAM), or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a compact disc read only memory (CD-ROM), any other optical medium, punch cards, paper tape, any other physical medium with patterns of holes, a random access memory (RAM), a programmable read only memory (PROM), and erasable programmable read only memory EPROM, a FLASH-EPROM, a solid state medium like a memory card, any other memory chip or cartridge, a carrier wave as described hereinafter, or any other medium from which a computer can read. A digital file attachment to an e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored. It should be noted that any computer readable medium that is not a signal transmission may be considered non-transitory.

The term "module" as used herein refers to any known or later developed hardware, software, firmware, artificial intelligence, fuzzy logic, or combination of hardware and software that is capable of performing the functionality associated with that element.

The terms "determine," "calculate," and "compute," and variations thereof, as used herein, are used interchangeably and include any type of methodology, process, mathematical operation, or technique.

The term "in communication with," as used herein, refers to any coupling, connection, or interaction using electrical signals to exchange information or data, using any system, hardware, software, protocol, or format, regardless of whether the exchange occurs wirelessly or over a wired connection.

The term "Bluetooth" may refer to wireless technology for exchanging data over short distances (using short-wavelength UHF radio waves in the ISM band) from fixed and mobile devices and building personal area networks (PANs). The technology may connect several devices in order for data synchronization between devices or between devices and a server.

The Summary is neither intended, nor should it be construed, as being representative of the full extent and scope of the present disclosure. Moreover, references made herein to "the present disclosure" or aspects thereof should be understood to mean certain embodiments of the present disclosure and should not necessarily be construed as limiting all embodiments to a particular description. The present disclosure is set forth in various levels of detail in the Summary as well as in the attached drawings and the Detailed Description and no limitation as to the scope of the present disclosure is intended by either the inclusion or non-inclusion of elements or components. Additional aspects of the present disclosure will become more readily apparent from the Detailed Description, particularly when taken together with the drawings.

BRIEF DESCRIPTION OF THE DRAWINGS

The accompanying drawings, which are incorporated herein and constitute a part of the specification, illustrate embodiments of the disclosure and together with the Summary given above and the Detailed Description given below serve to explain the principles of these embodiments. In certain instances, details that are not necessary for an understanding of the disclosure or that render other details difficult to perceive may have been omitted. It should be understood, of course, that the present disclosure is not necessarily limited to the particular embodiments illustrated herein. Additionally, it should be understood that the drawings are not necessarily to scale.

FIGS. 5A-5B are views of a sensor of one embodiment of the present disclosure, the sensor adapted to be worn by an individual and including a display that receives data from the system;

FIGS. 5C-5D are views of exemplary user interfaces presented by the display of the sensor of FIGS. 5A-5B.

Figure 1A:
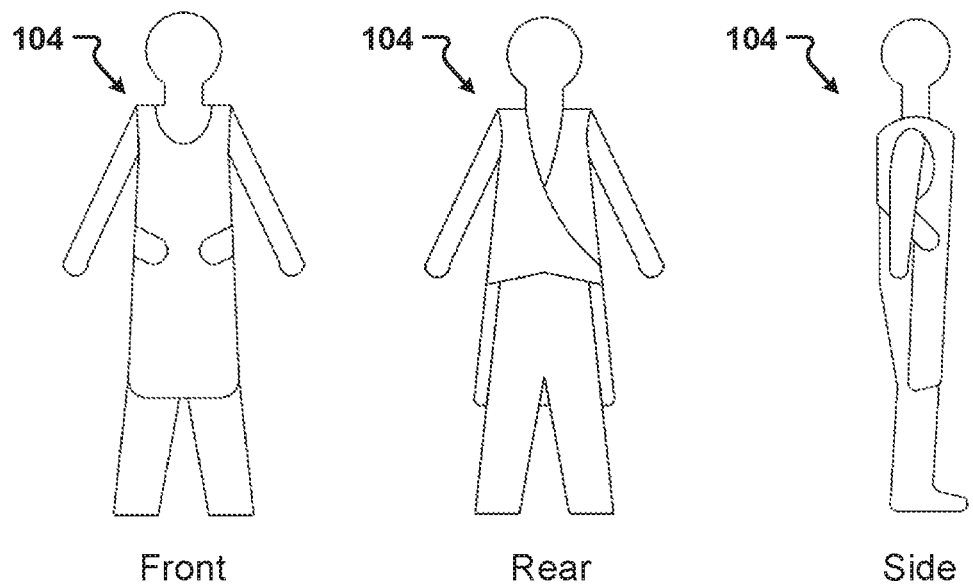
FIG. 1A provides elevation views of a prior art protective garment.
Figure 1B:
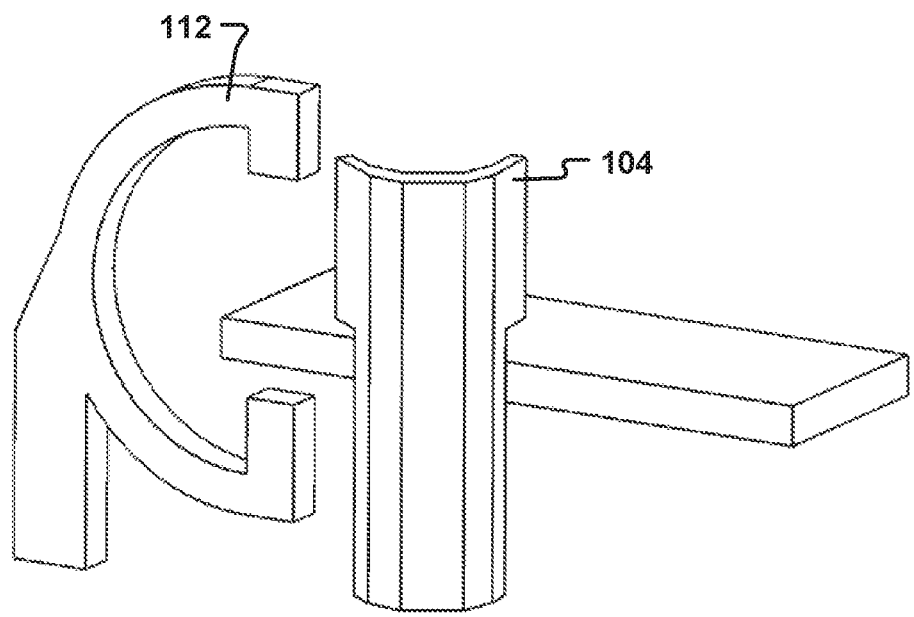
FIG. 1B is a perspective view of another prior art protective garment which is suspended proximate to an emitter of ionizing energy.
Figure 2A:
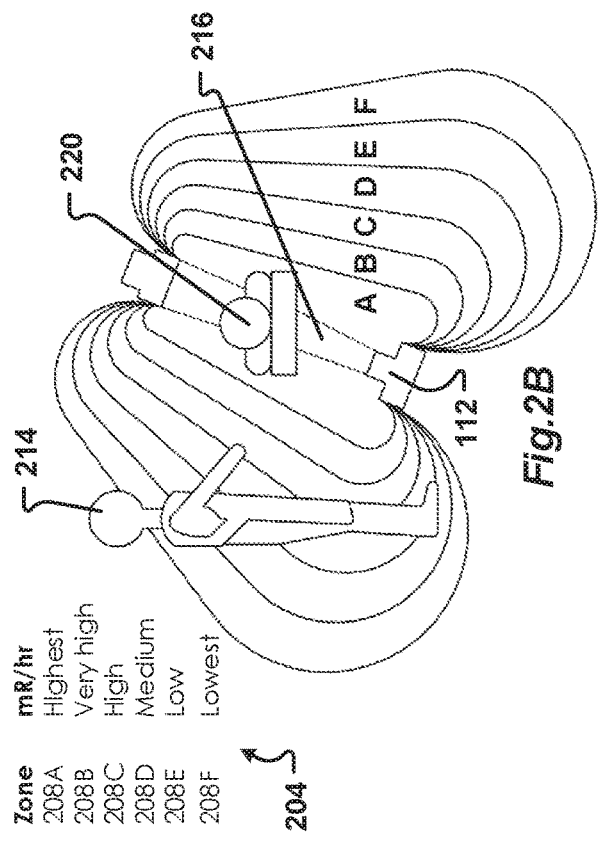
FIGS. 2A-2D are elevation views of ionizing energy fields generated by an emitter in a variety of orientations and illustrating doses of ionizing energy received by an individual in proximity to the emitter.
Figure 2C:
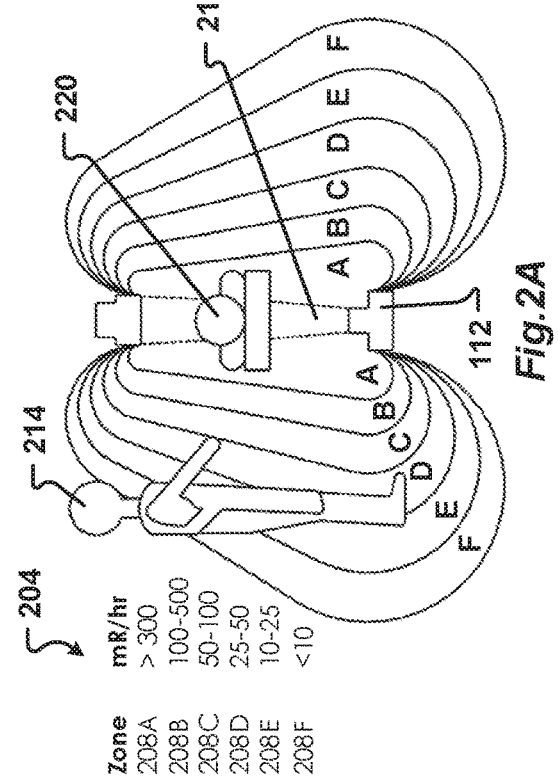
Figure 2B:
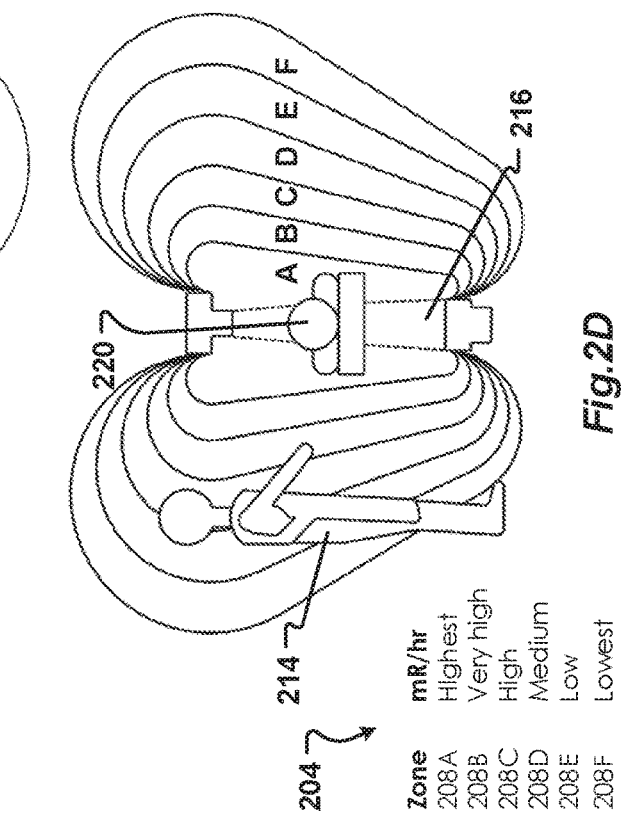
Figure 2D:
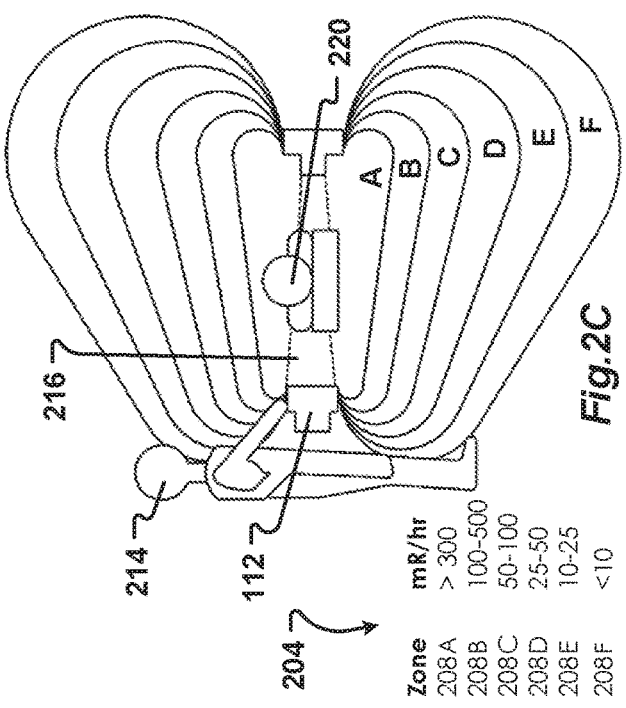
Figure 2E:
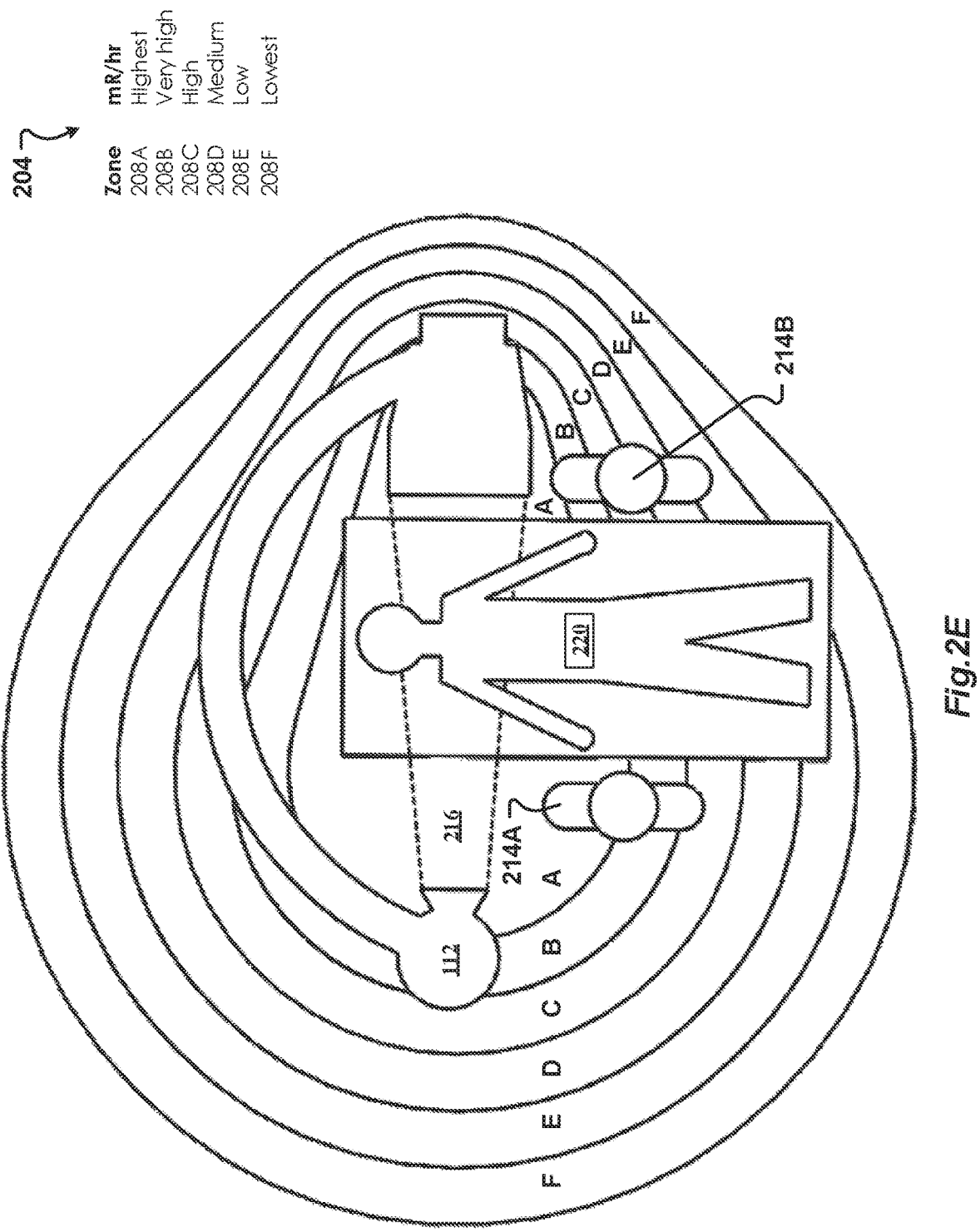
FIG. 2E is a top plan view of ionizing energy fields generated by an emitter similar to the elevation views of FIGS. 2A-2D.

Similar components and/or features may have the same reference number. Components of the same type may be distinguished by a letter following the reference number. If only the reference number is used, the description is applicable to any one of the similar components having the same reference number. To assist in the understanding of one embodiment of the present disclosure, the following list of components and associated numbering found in the drawings is provided herein:

| Number | Component |
|---|---|
| 104 | Protective garment |
| 108 | Protective garment |
| 112 | Emitter of ionizing energy |
| 204 | Amounts of ionizing energy |
| 208 | Zones |
| 214 | Individual |
| 216 | Beam of ionizing energy |
| 220 | Target |
| 304 | System |
| 310 | Emission device |
| 312 | Emitter |
| 314 | Individual |
| 320 | Target |
| 324 | Sensor |
| 326 | Field emitted by sensor |
| 327 | Energy received by sensor |
| 328 | Control system |
| 330 | Database |
| 332 | Telecommunication device |
| 402A | First user interface |
| 402B | Second user interface |
| 412 | Emitter |
| 414 | Individual |
| 416 | Beam |
| 420 | Target |
| 422 | Danger perimeter line |
| 424 | Inefficient perimeter line |
| 436 | Danger zone |
| 438 | Safe zone |
| 440 | Inefficient zone |
| 444 | Warning device |
| 448 | Alert icon |
| 452 | Alert message |
| 502A | First user interface |
| 502B | Second user interface |
| 514 | Individual |
| 524 | Sensor |
| 536 | Danger zone |
| 538 | Safe zone |
| 540 | Inefficient zone |
| 544 | Display |
| 548 | Icons |
| 600 | Method |
| 604 | Emitter shot ordered |
| 608 | Determine parameters of shot |
| 612 | Determine zones for shot |
| 616 | Determine locations of individuals |
| 620 | Determine if an individual is in danger zone |
| 624 | Provide warning |
| 628 | Prevent/delay firing of emitter |
| 632 | Fire emitter |
| 636 | Sensors collect data on shot |
| 640 | Control system receives sensor data |

DETAILED DESCRIPTION

The present disclosure has significant benefits across a broad spectrum of endeavors. It is the Applicant's intent that this specification and the claims appended hereto be accorded a breadth in keeping with the scope and spirit of the disclosure being disclosed despite what might appear to be limiting language imposed by the requirements of referring to the specific examples disclosed. To acquaint persons skilled in the pertinent arts most closely related to the present disclosure, a preferred embodiment that illustrates the best mode now contemplated for putting the disclosure into practice is described herein by, and with reference to, the annexed drawings that form a part of the specification. The exemplary embodiment is described in detail without attempting to describe all of the various forms and modifications in which the disclosure might be embodied. As such, the embodiments described herein are illustrative, and as will become apparent to those skilled in the arts, may be modified in numerous ways within the scope and spirit of the disclosure.

Figure 3:
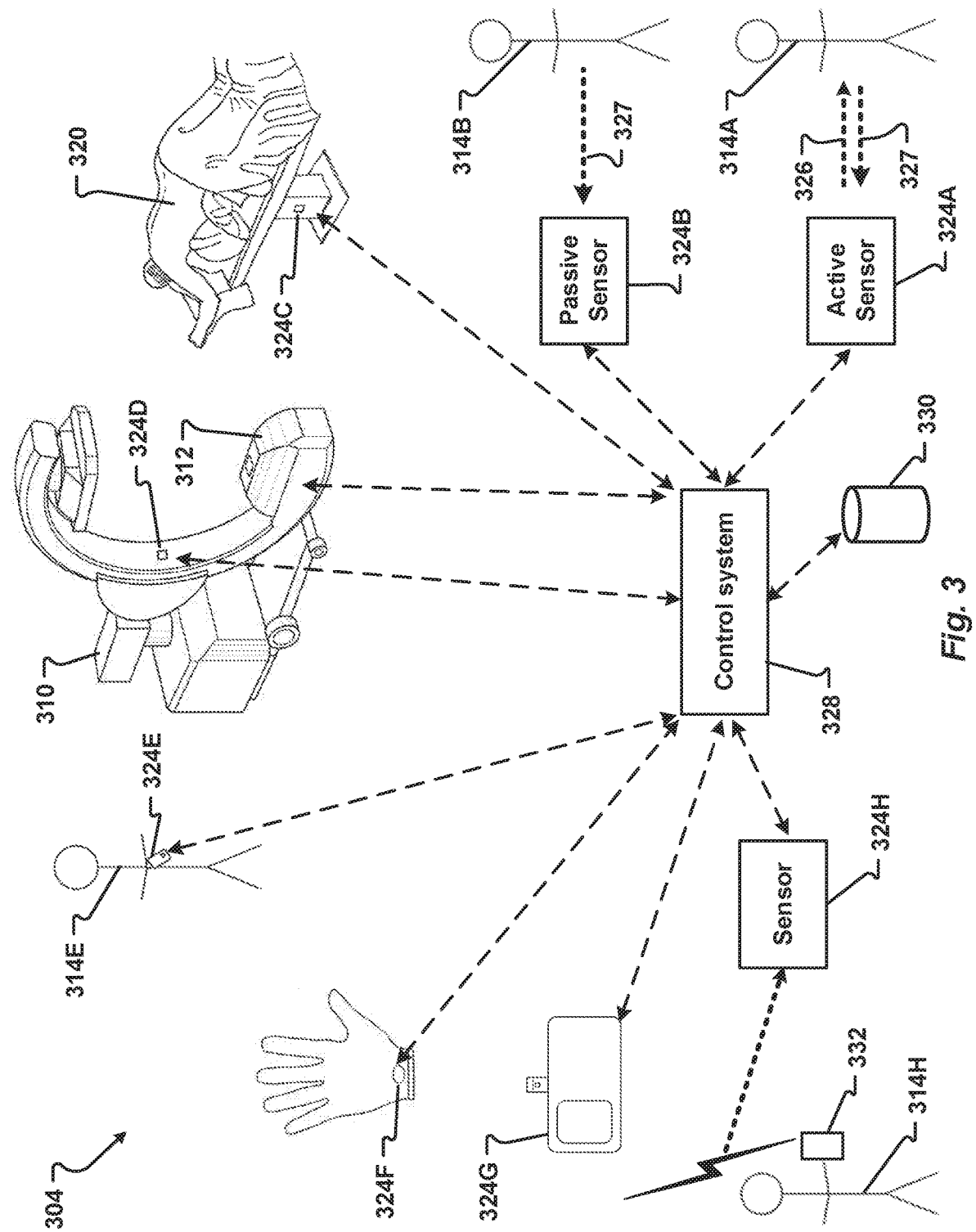
FIG. 3 is a schematic view of a system of the present disclosure.

Referring now to FIG. 3, a schematic view of a system 304 of the present disclosure is generally illustrated. The system 304 comprises a control system 328 in communication with a plurality of sensors 324 arranged in proximity to a device 310 that includes an emitter 312 of ionizing energy.

Optionally, the control system 328 may be in communication with the emission device 310 and with a database 330. Communication between the control system 328 and the sensors 324, emission device 310, and database 330 may be wireless (e.g., through Bluetooth™, 802.11, etc.) or through a wired communication. Information packets (in the form of digital values from the sensors 324) which include a time stamp may be periodically sent from the sensor 324 to the control system 328. The control system 328 can then calculate, with the information packets and the time stamps, the location and/or movement of individuals 314 in proximity to the emitter 312.

The sensors 324 may be of any size and type. The sensors may include an embedded processor. In some configurations, processing of data collected by the sensors 324 can be distributed between the sensor 324 and a processor of the control system 328 to increase efficiency or accuracy of the system 304. In one embodiment, at least some sensor data processing is performed by the sensors 324. Optionally, all processing of sensor data is performed by the control system 328.

Some of the sensors 324 may be operable to detect the presence of an individual. For example, in one embodiment, sensor 324A is active. More specifically, sensor 324A emits a field 326 to detect individuals. When an individual 314A is within the field 326, the active sensor 324A receives reflections 327 from the individual 314A. Using the time the field 326 was emitted and the time the reflection 327 was received, the sensor 324A can determine the distance of the individual 314A from the sensor 324A. The sensor 324A can then transmit the location of the individual 314A with respect to the sensor 324A to the control system 328. In this manner, the system 304 may locate and determine the presence of individuals that are not wearing or carrying sensors that communicate with the system 304 and report the location of the sensor.

Additionally, or alternatively, the system 304 may include one or more passive sensors 324B operable to passively determine the presence of an individual 314B. For example, the passive sensor 324B may include an optical or infrared sensor to detect the individual. In another embodiment, the passive sensor 324B may include a microphone to detect sounds emitted by individual 314B. Energy 327, such as light, heat, or sound emitting or reflected from the individual 314B may be received by the sensor 324B. The received energy 327 can then be used by sensor 324B to determine the location of individual 314B. In one embodiment, a plurality of passive sensors 324B may have fixed positions that are known by the control system 328. Accordingly, the control system 328 can use differences in the data collected by each of the plurality of passive sensors 324B to determine the position of individual 314B. In one embodiment, the system 304 includes at least three passive sensors 324B. The system 304 can use information about the received energy 327 collected by the at least three passive sensors 324B to triangulate the location of individual 314B.

Another sensor 324C may be positioned proximate to a target 320 of the ionizing energy produced by the emitter 312. The control system 328 may use information from sensor 324C to determine a distance between the target 320 and the emitter 312 and to determine an expected (or actual) pattern of scattered ionizing energy.

A sensor 324D may also be positioned on a portion of the device 310. Optionally, the control system 328 may receive information directly from the emission device 310. The control system 328 can use the information from sensor 324D and/or from the emission device 310 to determine an orientation of the emitter 312 and the parameters of an expected firing of emitter 312. The parameters may include a focal point, a power setting, a duration, an orientation of the emitter 312, planned movement of the emitter 312 during the firing, and other information about the expected firing.

Other sensors 324E-324G may be worn or carried by individuals 314 in proximity to the device 310. Others of the sensors 324E-324G may be detectable by the control system 328. Some of the sensors 324E-324G may transmit information to the control system 328. The sensors may include badges 324E, 324G and sensors 324F incorporated into objects worn by individuals, such as gloves and other protective garments and clothing. Sensors 324E-324G may periodically transmit location information to the control system 328. Additionally, or alternatively, sensors 324E-324G may transmit signals that are detectable by receivers of the control system 328. The control system may determine the location of each sensor 324E-324G by triangulating the received signals.

The control system 328 may use information from these sensors 324E-324G to determine a location of an associated individual 314E with respect to the emitter 312. Sensors 324E-324G may comprise existing devices commonly worn by individuals 314 who work in proximity to sources of ionizing energy, such as dosimeters and identification badges. However, in one embodiment, sensors 324E-324G only provide, or are used to determine, a location of an individual and do not include a dosimeter. Optionally, the control system 328 may receive information about a dose of ionizing energy received from a sensor 324E-324G associated with an individual 314E. This dose information may be stored in database 330 for future use such as, but not limited to, tracking doses of ionizing energy received by individuals and to adjust the contours of fields of estimated doses of ionizing energy produced by the emitter 312.

Other sensors 324H may detect signals emitted by a device 332 carried by an individual 314H. The signals may include, but are not limited to, radio frequency emissions such as a telecommunications signal, a Bluetooth signal, and a Wi-Fi signal. In this manner, the system 304 may detect the presence and determine a location of the individual 314H by triangulating signals emitted from the individual's communication device 332.

The control system 328 may also be in communication with the database 330. The database 330 may include information about the emission device 310 such as known emissions patterns. Some emission devices 310 include pre-set parameters for common scans, such as (i) cardio fluoro; (ii) vascular fluoro; (iii) pediatric fluoro; (iv) EP fluoro; (v) cardiac exposures; (vi) vascular DSA exposures; (vii) rotational scans; (viii) a ventricle study; (ix) a valve study; (x) a coronary study; (xi) a cardio cine, and others. The control system 328 can retrieve information related to all pre-set scan parameters of an emission device 310 to generate contours of zones of ionizing energy expected to be produced by the emission device for each emission of ionizing energy generated by the device. The database 330 may also include information regarding ionizing energy dose requirements set by employers, facilities, and government agencies that can be used by the control system 328 to determine danger zones, safe zones, and inefficient zones.

Figure 4A:
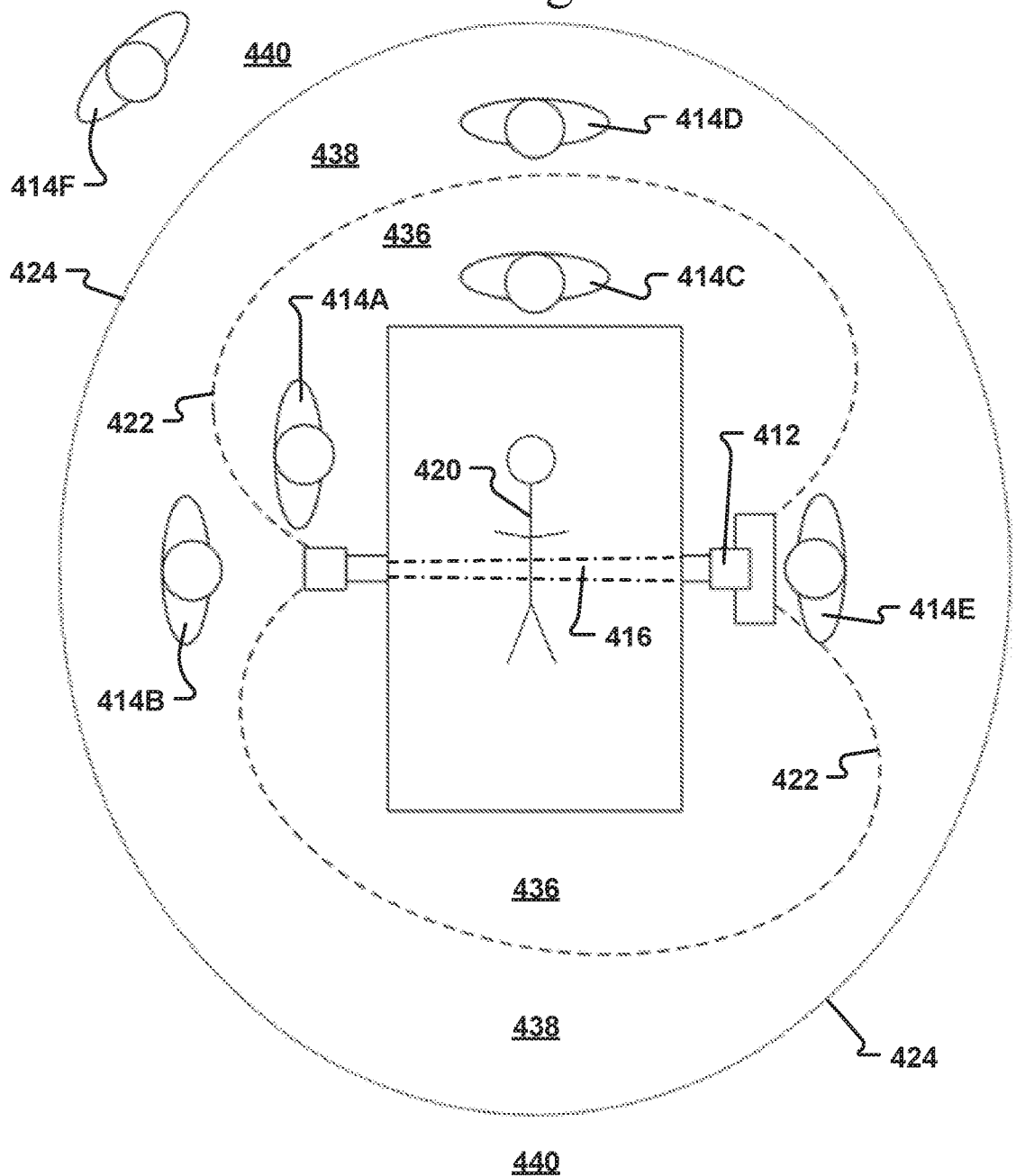
FIG. 4A is a first user interface generated by a system of the present disclosure showing locations of individuals in proximity to an emitter and contours of a danger zone, a safe zone, and an inefficient zone in relation to the emitter, the first user interface comprising a top plan view of an operating room.
Figure 4B:
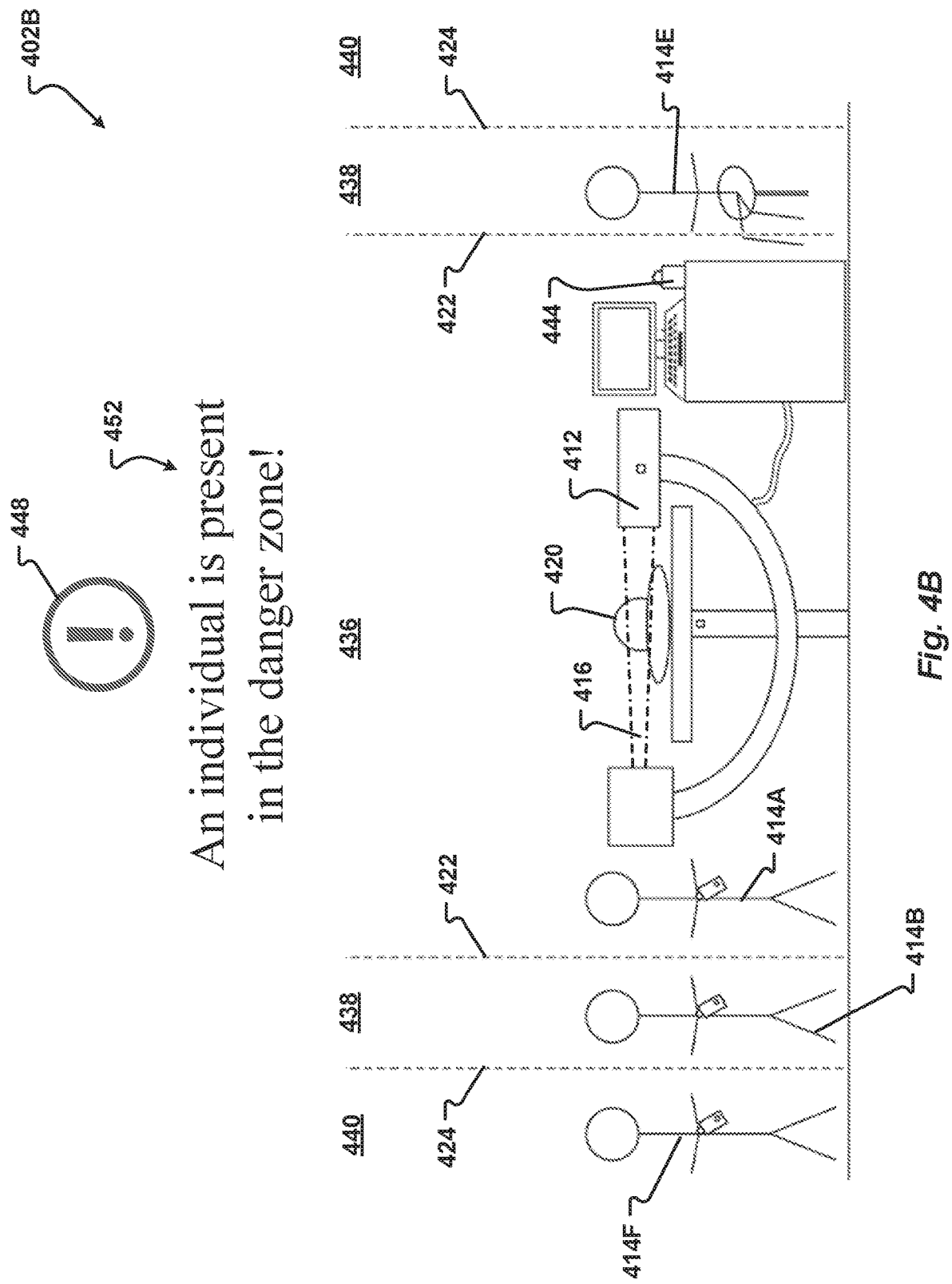
FIG. 4B is a second user interface generated by the system that is similar to the first user interface of FIG. 4A, the second user interface comprising a front elevation view of the operating room.

Referring now to FIGS. 4A-4B, using the information received from the sensors 324, the database 330, and, optionally, from the emission device 310, the system 304 can generate a variety of user interfaces 402A, 402B. The user interfaces may incorporate locations of each individual 414 located in proximity to the emitter 412. The user interfaces 402A, 402B may optionally include a representation 416 of the path of the beam emitted by emitter 412.

The user interfaces 402A, 402B may visually indicate zones 436, 438, 440 of different levels of ionizing energy expected to be emitted during a planned firing of the emitter 412. More specifically, the control system 328 may use information received from one or more of the sensors 324, from the emission device 310, and the database 330 to determine a danger zone 436, a safe zone 438, and an inefficient zone 440. Optionally, the control system 328 may display a danger line 422 associated with the outer perimeter of the danger zone 436 in one or more of UIs 402A, 402B. The control system 328 may also display an inefficient line 424 associated with the outer extent of the safe zone 438. In one embodiment, danger line 422 is displayed differently than inefficient line 424, for example, as illustrated in the exemplary user interface 402A of FIG. 4A.

As described above, the danger zone 436 comprises an area where a dose of ionizing energy is expected to exceed a predetermined level. The safe zone 438 comprises an area where the dose of ionizing energy is expected to be below the predetermined level. The inefficient zone 440 comprises an area beyond the safe zone 438 in which the dose of ionizing energy is not significantly lower than the dose in the safe zone 438 and which introduces inefficiencies due to an excessive distance from a work area, such as proximate to a patient 420. Said another way, the safe zone 438 represents an optimal area for individuals 414 such that the individuals receive less than a predetermined dose of ionizing energy without being unnecessarily far from a work area.

In one embodiment, the control system 328 can generate zones 436, 438, 440 specific to one or more individuals 414. For example, some individuals may have different ionizing energy dose requirements that other individuals. The dose requirements may be different due to the individual's duties during an emission by the emitter, shielding wore by the individual, employer requirements, facility requirements, government rules, and by preference of the individual. According, a first amount (or dose) of ionizing energy that can be received by a first individual can be entered in the control system. A second amount of ionizing energy that can be received can be entered in the control system for a second individual. In this manner, the control system 328 can generates zones 436, 438, 440 specific to the first individual that are different than the danger, safe, and inefficient zones for the second individual.

The system 304 can present zones 436, 438, 440 in user interfaces 402 such that the zones are visually distinct. Further, individuals 414 may receive information from the system 304 indicating which zone the individual is in. For example, individuals 414A, and 414C are in the danger zone 436. Individual 414E is at least partially within the danger zone 436 as illustrated in FIG. 4B. Individuals 414B, 414D are within the safe zone 438, and individual 414F is further than necessary from the emitter 412 and is within the inefficient zone 440.

The system 304 may provide an alert as described herein to individuals 414A, 414C, 414E and to an operator of the emission device 310. For example, a warning device 444, may provide a visual indication (such as a blinking light) and/or an audible indication (such as an alarm or buzzer) to notify operator 414E that individuals 414A, 414C, and 414E are at least partially within danger zone 436. Further, some or all of the information shown in user interfaces 402A, 402B can be provided by speakers of the system 304 in an audio alert, e.g., "An individual is present in the danger zone!"

Optionally, the system 304 may generate an alert icon 448 in user interfaces 402A, 402B to draw the user's attention. The alert icon 448 may be displayed when at least one individual 414 is at least partially within the danger zone 436. Further, the display space of the user interfaces 402A, 402B can include the alert message 452, e.g., "An individual is present in the danger zone." In one embodiment, the alert message 452 may identify the individuals 414A, 414C, and 414E present in the danger zone 436, such as by the individual's name.

In one embodiment, the control system 328 automatically controls the emitter 412 when an individual is in the danger zone 436 to avoid injury to the individual. In this embodiment, the control system may simply indicate to the user in alert message 452 of user interface 402A, 402B what action is being taken, e.g., "Preventing firing of emitter."

The user interfaces 402A, 402B can also provide other visual information to users. In another embodiment, the system 304 may display individuals 414A, 414C, and 414E within the danger zone 436 differently in user interface 402A, 402B than individuals outside danger zone. For example, individuals 414A, 414C, and 414E may be highlighted or have indicators, such as arrows, pointing to them. In this manner, the system 304 can provide visual information to the user to quickly identify the individuals 414A, 414C, and 414E within the danger zone 436. Other types of alerts are also possible and contemplated.

The system 304 may also ignore the presence of certain individuals within the danger zone 436. For example, in a medical setting, a patient 420 that is the target of the emitter 312 may be automatically ignored by the system 304. Optionally, the operator 414E may send a command to the system to ignore the presence of predetermined individuals within the danger zone 436. In this manner, the operator 414E may prevent alarms and, optionally, unnecessary delay of operation of the emitter 412 for individuals within the danger zone 436 that are wearing appropriate protective garments. For example, operators 414E of emitters 412 may frequently be located within the danger zone 436. Because of this, operators 414E generally wear appropriate protective garments. Accordingly, the operator 414E may enter an ignore command that causes the system 304 to ignore the presence of the operator 414E within the danger zone. Other individuals, such as a surgeon 414A performing a procedure on a patient 420 may also be required to remain in the danger zone 436 during a shot of the emitter. In this case, the operator 414E and/or the surgeon 414A may enter an ignore command to ignore the surgeon's presence within the danger zone. Optionally, individuals that expect to be within the danger zone 436 during a procedure may inactivate or remove their sensors 324E-324G when the individual is wearing required protective garments.

Optionally, the control system 328 may prevent, or delay, operation of the emission device 310 while individuals 414A, 414C, 414E are in the danger zone. In one embodiment, the control system 328 will ignore the presence of an individual within the danger zone after receiving an ignore command from at least one of the individual and the operator 414E of the emitter 312. In another embodiment, the control system 328 can determine that an individual is wearing protective garments appropriate for a dose of ionizing energy the individual may receive in the danger zone 436. For example, in one embodiment, a sensor 324 of the system 304 may detect a signal from an emitter associated with a protective garment. In this manner, the control system 328 may determine that an individual 314 is wearing a certain type of protective garment. Accordingly, after determining the individual is wearing appropriate protective garments, the control system 328 may ignore the presence of the individual in the danger zone.

Additionally, the system 304 may provide a visual indication in user interfaces 402 when individuals are within the danger zone 436. Optionally, the system 304 may provide a visual or audible alert, such as flashing lights or sounding an alarm, within a room in which the device 310 is located to warn individuals within the danger zone 436.

Referring now to FIG. 5, embodiments of a device 524 of the present invention that includes a display 544 are illustrated. The device 524 is in communication with the control system 328. In one embodiment, the device 524 comprises glasses or a face shield. However, as will be appreciated by one of skill in the art, the display 544 may be incorporated into any type of object worn or carried by an individual. For example, the display may be incorporated into a pair of gloves, a badge, a watch, a ring, a sensor 324, or a telecommunication device 332. An individual 514 may wear the device 524 such that the display 544 is within the individual's line of sight. Said another way, the display 544 may comprise a heads up display.

The display 544 may present a variety of information received from the control system 328. For example, FIGS. 5C-5D illustrate exemplary user interfaces 502 presented by display 544. The user interfaces 502 may provide icons 548 that comprise different colors and shapes associated with zones 436-440 in which the individual 514 is located. More specifically, user interface 502A provides icons 548A-548C with different colors associated with each zone 436-440. For example, when the individual 514 is in the safe zone 438, the icon 548A may be green. Similarly, the icon 548B may be yellow when the individual is in the inefficient zone 440 and the icon 548C may be red when the individual is in the danger zone 436. Additionally or alternatively, the icons may have different shapes 548D, 548E, 548F associated with the safe zone 438, inefficient zone 440, and the danger zone 436 respectively. Optionally, the icons 548A-548F in each user interface 502 may be arranged in discrete zones or regions 538, 540, 536 associated with zones 438, 440, and 436 respectively. In this manner, the user 514 may receive information in the display 544 associated with a zone 436, 438, 440 based on one or more of: (i) a color of an icon (548A, 548B, 548C); (ii) a shape of an icon (548D, 548E, 548F); and (iii) a location of an icon within a display zone 538, 540, 536.

Although FIGS. 5C-5D illustrates icons 548 with exemplary shapes and colors, as will be appreciated by one of skill in the art, other shapes and colors for icons 548 may be used with the system 304 of the present disclosure. Further, the order of display of icons 548 and display zones 536, 538, 540 may be altered.

Figure 6:
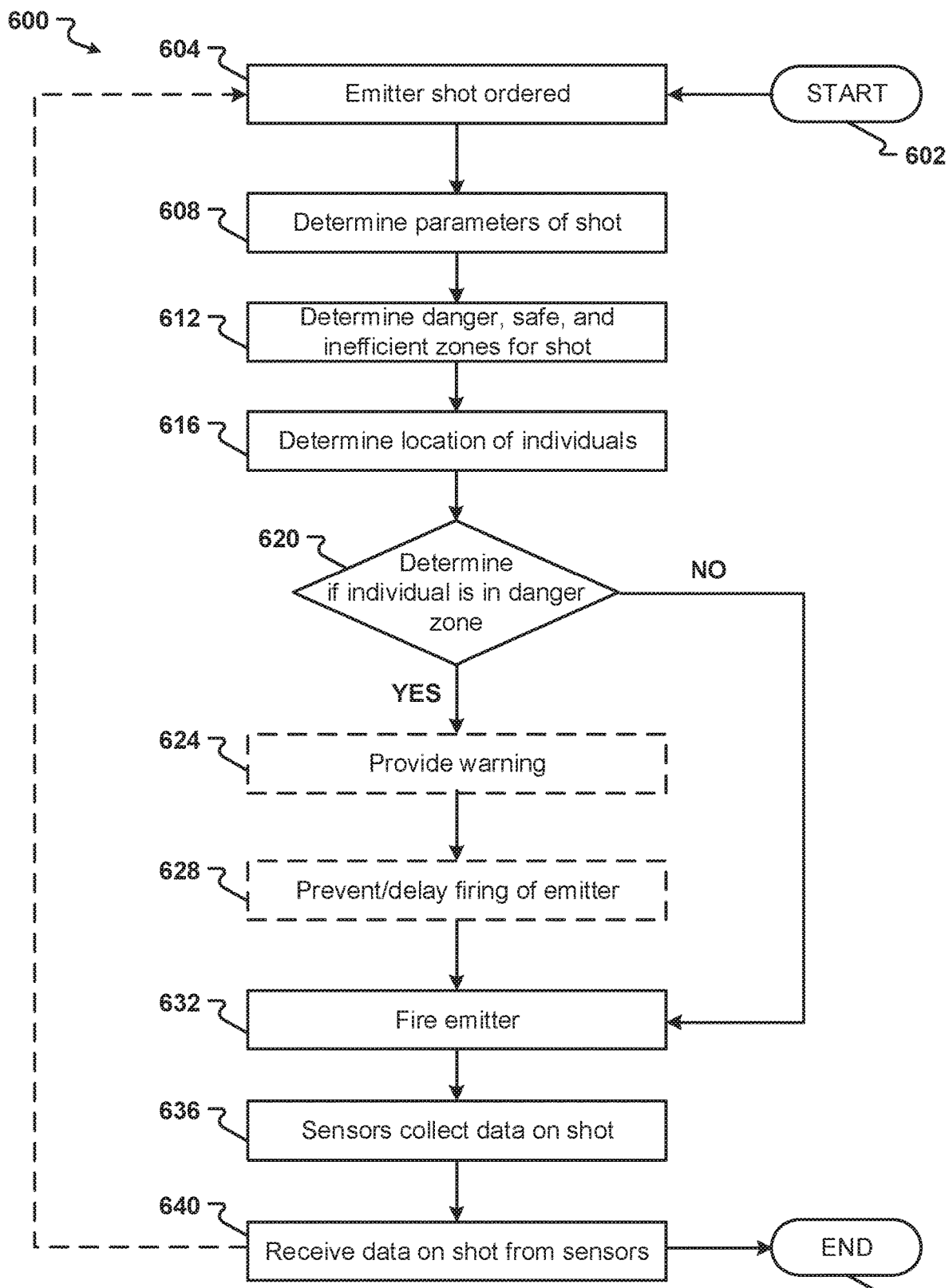
FIG. 6 is a flow chart of one embodiment of a method of determining if an individual is within a predetermined proximity to an emitter of ionizing energy.

Referring now to FIG. 6, an embodiment of a method 600 of determining of determining if an individual is within a predetermined proximity to an emitter 312 of ionizing energy of one embodiment of the present disclosure is generally illustrated. Generally, the method 600 starts with a start operation 602 and ends with an end operation 644. While a general order of operations of the method 600 is shown in FIG. 6, the method 600 can include more or fewer operations or can arrange the order of the operations differently than those shown in FIG. 6. Additionally, although the operations of method 600 may be described sequentially, many of the operations may in fact be performed in parallel or concurrently. Further, described operations may be omitted in some embodiments. The method 600 can be executed as a set of computer-executable instructions executed by a computer system and encoded or stored on a computer readable medium. The computer system may be the control system 328. Hereinafter, the method 600 shall be explained with reference to the systems, sensors, user interfaces, and devices described in conjunction with FIGS. 1-5.

A shot of an emitter 312 is ordered in operation 604. The order for the shot may come from an individual 414A, such as a surgeon. The individual 414A may arrange or orient the emitter 312 with respect to a target 320, such as a patient.

In operation 608, the control system 328 may use information received from sensors 324, an operator of the emitter 312, and, optionally, from the emitting device 310 to determine parameters of the shot. More specifically, the control system 328 may receive or determine information related to an orientation of the emitter 312, planned movement of the emitter during the shot, a beam path, a focal point, a duration, and power levels of the planned shot.

The control system 328 may then determine, in operation 612 contours of zones of ionizing energy expected to be generated by the shot of the emitter 312. The control system 328 may use information received from a database 330 when determining the contours. The control system 328 may then determine a danger zone 436, a safe zone 438, and, optionally, an inefficient zone 440. The danger zone 436 is an area expected to receive more than a first amount of ionizing energy. The inefficient zone 440 is an area expected to receive less than a second amount of ionizing energy. The safe zone 438 may be defined as an area between zones 436, 440.

In operation 616 the control system 328 determines locations of individuals 314 with respect to the emitter 312 and zones 436-440. More specifically, the control system 328 receives information from sensors 324 to locate and identify individuals 314 proximate to the emitter 312. The control system 328 can then determine zones 436-440 in which each individual 314 is located.

The control system 328 then determines if any individual 314 is in the danger zone 436 in operation 620. If no individuals 314 are in the danger zone 436, method 600 proceeds NO to operation 632. When an individual is in (or at least partially in) the danger zone 436, method 600 proceeds YES to operation 624.

In operation 624, the control system 328 may optionally provide a warning. The warning may be presented to the individual 314 and/or to an operator of the emitter device 310. Optionally, the warning may be one or more of audible, visual, and haptic. The warning may also be presented on a user interface 402, 502 by a display, such as but not limited to display 544 of device 524. In one embodiment, the warning may be provided in one or more of user interfaces 402A, 402B. The warning may also include display of one or more icons 548 in a user interface 502. The icons 548 may be associated with one or more portions 536-540 of a display 544.

In operation 628, the control system 328 may automatically control functions of the emission device 310. For example, in one embodiment, the control system 328 may optionally prevent the firing of the emitter 312 in operation 628. In another embodiment, the control system 326 at least delays firing of the emitter 312 in operation 628. Alternatively, the control system 328 may delay the firing of emitter 312 by a predetermined amount of time to enable the individual to move out of the danger zone 436. In one embodiment, the control system 328 will not allow the emitter 312 to discharge ionizing energy when an individual is within the danger zone 436.

Optionally, when an individual is within the danger zone 536, the operator of the emitter 312 may enter a command to authorize the firing of the emitter 312 and the method 600 will proceed to operation 632. In another embodiment, the operator may enter a command to ignore the presence of one or more selected individuals within the danger zone 536. The ignore command may be entered for one shot or for all future shots of the emitter 312.

In operation 632 the control system 328 fires the emitter 312. Sensors 324 proximate to the emitter 312 may collect data about the shot of the emitter 312 in operation 636. For example, some of the sensors 324 may comprise dosimeters that collect information on doses of ionizing energy received by the sensors. The sensors 324 may transmit the dose information to the control system 328. The information may be transmitted to the control system 328 during or after the shot of the emitter 312.

The control system 328 may collect ionizing energy dose information from sensors 324 in operation 640. The dose information received from the sensors 324 may be used by the control system 328 to adjust the zones 436-440 for subsequent shots of the emitter 312. Optionally, the control system 328 may store the dose information received from the sensors 324 in the database 330 for subsequent use and analysis.

In one embodiment, if dose information received from a sensor 324 exceeds an expected level of ionizing energy expected for the location of the sensor 324 for the shot of the emitter 312, the control system 328 may stop the firing of the emitter 312. More specifically, the control system 328 may compare actual dose information received from a sensor 324 during a shot of the emitter 312 with the predicted levels of ionizing energy for the shot. If the location of the sensor 324 is in a predicted safe zone 438, but the actual dose information is higher than the predicted level, the control system 328 can stop the firing. In this manner, individuals 414 in a predicted safe zone may be protected from receiving more than a predetermined amount of ionizing energy.

Optionally, method 600 may return to operation 604 a plurality of times. Subsequently, method 600 proceeds to END operation 644

The present disclosure has been presented for purposes of illustration and description, but is not intended to be exhaustive or limiting of the disclosure to the form disclosed. Many modifications and variations will be apparent to those of ordinary skill in the art. The embodiments described and shown in the figures were chosen and described in order to best explain the principles of the disclosure, the practical application, and to enable those of ordinary skill in the art to understand the disclosure. The system and method of the present disclosure could be added to an existing emitter of ionizing energy, such as a medical radiological imaging device including a fluoroscope, or integrated into the emitter's control system.

By way of providing additional background, context, and to further satisfy the written description requirements of 35 U.S.C. § 112, the following are incorporated herein by reference in their entireties for the express purpose of explaining and further describing the present invention: U.S. Pat. Nos. 4,642,463; 5,023,444; 5,173,609; 5,440,290; 5,444,756; 5,572,027; 5,635,717; 6,031,454; 6,282,410; 6,650,930; 7,009,182; 7,125,166; 7,465,925; 7,786,449; 8,113,713; 8,242,464; 8,581,214; 8,810,416; 9,057,786; 9,075,146; U.S. Patent App. Pub. 2011/0063127; U.S. Patent App. Pub. 2012/0154170; U.S. Patent App. Pub. 2013/0173221; U.S. Patent App. Pub. 2013/0270430; U.S. Patent App. Pub. 2015/0009044; and European Pat. App. Pub. 1865338.

While various embodiments of the present disclosure have been described in detail, it is apparent that modifications and alterations of those embodiments will occur to those skilled in the art. Moreover, references made herein to "the present disclosure" or aspects thereof should be understood to mean certain embodiments of the present disclosure and should not necessarily be construed as limiting all embodiments to a particular description. It is to be expressly understood that such modifications and alterations are within the scope and spirit of the present disclosure, as set forth in the following claims.

Optionally, the system and method of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the disclosed embodiments, configurations and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The system described herein can relate to communications systems and/or devices and may be capable of communicating with other devices and/or to an individual or group of individuals. Further, the system can receive user input in unique ways. The overall design and functionality of the system provides for enhanced surgical outcomes for patients and improved patient management by medical providers. As described herein, the system may be electrical, mechanical, electro-mechanical, software-based, and/or combinations thereof.

The exemplary systems and methods of this disclosure have been described in relation to a system and associated devices. However, to avoid unnecessarily obscuring the present disclosure, the preceding description omits a number of known structures and devices. This omission is not to be construed as a limitation of the scopes of the claims. Specific details are set forth to provide an understanding of the present disclosure. It should however be appreciated that the present disclosure may be practiced in a variety of ways beyond the specific detail set forth herein.

Furthermore, while the exemplary aspects, embodiments, options, and/or configurations illustrated herein may show various components of the system collocated, certain components of the system can be located remotely, at distant portions of a distributed network, such as a LAN and/or the Internet, or within a dedicated system. Thus, it should be appreciated, that the components of the system can be combined in to one or more devices, such as a Personal Computer (PC), laptop, netbook, smart phone, Personal Digital Assistant (PDA), tablet, etc., or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements of the system can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

A number of variations and modifications of the disclosure can be used. It would be possible to provide some features of the disclosure without providing others. The system and method of the present disclosure could be added to, or used in conjunction with, an existing data system or medical imaging system.

The present disclosure, in various aspects, embodiments, and/or configurations, includes components, methods, processes, systems and/or apparatus substantially as depicted and described herein, including various aspects, embodiments, configurations embodiments, subcombinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and\or reducing cost of implementation.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

Examples of the processors that may used in the system, as described herein, may include, but are not limited to: at least one of Qualcomm® Snapdragon® 800 and 801, Qualcomm® Snapdragon® 620 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3560K 22 nm Ivy Bridge, the AMD® FX™ family of processors, AMD® FX-4300, FX-6300, and FX-8350 32 nm Vishera, AMD® Kaveri processors, ARM® Cortex-A and ARM926EJ-S™ processors, other industry-equivalent processors, and may perform computational functions using any known or future-developed standard, instruction set, libraries, and/or architecture.

What is claimed is:

1. A system for alerting an individual of exposure to a source of ionizing energy, comprising:
    a computational machine comprising a processor and memory, the processor in communication with the memory and at least one output device;
    at least one sensor in communication with the computational machine and configured to monitor an area proximate to the source of ionizing energy;

a program stored in the memory and executable by the processor with instructions to:
  determine contours of at least two zones of ionizing energy generated by an emission of ionizing energy by the source of ionizing energy;
  receive data from the at least one sensor related to the location of the individual;
  determine a zone of the at least two zones of ionizing energy in which the individual is located; and
  generate, by the output device, a first alert when the individual is at least partially in a zone expected to receive more than a first amount of ionizing energy;
  wherein the at least two zones of ionizing comprise an optimal zone and a danger zone.

2. The system of claim 1, wherein the program further includes an instruction to receive information related to the emission of ionizing energy to be generated by the source.

3. The system of claim 2, wherein the information includes at least one of an orientation of the source, a path of the emission, a focal point of the emission, a duration of the emission, and a power level of the emission.

4. The system of claim 1, wherein the at least two zones include: (i) a danger zone; (ii) an inefficient zone; and (iii) an optimal zone between the danger zone and the inefficient zone.

5. The system of claim 1, wherein the program further includes an instruction to delay the emission of ionizing energy when the individual is at least partially in the danger zone.

6. The system of claim 5, wherein the delay is for a predetermined amount of time.

7. The system of claim 5, wherein the delay continues until the individual is completely outside of the danger zone.

8. The system of claim 1, wherein the program further includes an instruction to stop an emission of the source when the individual moves at least partially into the danger zone during the emission.

9. The system of claim 8, wherein the program further includes an instruction to generate, by the output device, a second alert when the individual is in the optimal zone.

10. The system of claim 8, wherein the output device displays:
  the location of the individual; and
  contours associated with each of the danger zone; and the optimal zone.

11. The system of claim 1, wherein the predetermined area of the at least one sensor is adjustable.

12. The system of claim 11, wherein the at least one sensor comprises a plurality of sensors, each of the plurality of sensors oriented in unique directions.

13. The system of claim 1, wherein the output device comprises a display associated with a device wearable by the individual.

14. A method for providing an alert to an individual related to a dose of ionizing energy emitted from a source of ionizing energy, comprising:
  determining at least two contours of levels of ionizing energy generated by the emission of ionizing energy by the source;
  determining one or more zones where the individual is located in relation to the source, the zones comprising at least an optimal zone, an inefficient zone and a danger zone, wherein the danger zone is defined by a first, predetermined amount of ionizing energy; and
  generating, by the output device, the alert when at least a portion of the individual's body is expected to receive more than the first, predetermined amount of ionizing energy;
  wherein the steps of determining at least two contours, determining one or more zones and generating, by the output device, the alert are performed by a computational machine comprising a program stores in memory and executable by a processor.

15. The method of claim 14, further comprising receiving data from at least one sensor related to the location of the individual.

16. The method of claim 14, wherein determining the at least two contour levels includes receiving information related to the emission to be generated by the source, the information including at least one of: (i) an orientation of the source; (ii) a path of the emission; (iii) a focal point of the emission; (iv) a duration of the emission, and (v) a power level of the emission.

17. The method of claim 14, further comprising delaying the emission of ionizing energy when the individual is expected to receive more than the first, predetermined amount of ionizing energy.

18. The method of claim 14, further comprising:
  generating, by the output device, a second alert when at least a portion of the individual's body is expected to receive less than a second amount of ionizing energy.

* * * * *